United States Patent

Sano et al.

[11] Patent Number: 5,503,943
[45] Date of Patent: Apr. 2, 1996

[54] MAGNETIC RECORDING MEDIUM

[75] Inventors: Kunihiko Sano; Tadashi Yasunaga; Hiroaki Doushita, all of Kanagawa, Japan

[73] Assignee: Fuji Photo Film Co., Ltd., Kanagawa, Japan

[21] Appl. No.: 285,781

[22] Filed: Aug. 4, 1994

Related U.S. Application Data

[63] Continuation of Ser. No. 521,483, May 10, 1990, abandoned.

[30] Foreign Application Priority Data

May 12, 1989 [JP] Japan .................................. 1-119859
Aug. 30, 1989 [JP] Japan .................................. 1-223599

[51] Int. Cl.$^6$ ...................................................... G11B 5/66
[52] U.S. Cl. ......................... 428/694 T; 428/694 TM; 428/695; 428/900; 204/192.2; 427/255.3
[58] Field of Search .................. 428/694 T, 695, 428/900, 694 TM; 204/192.2; 427/255.3

[56] References Cited

U.S. PATENT DOCUMENTS

| | | | |
|---|---|---|---|
| 4,323,629 | 4/1982 | Kunieda | 428/457 |
| 4,511,635 | 4/1985 | Nagao | 428/694 TS |
| 4,521,481 | 6/1985 | Nagao | 428/336 |
| 4,536,443 | 8/1985 | Nagao | 428/336 |
| 4,567,116 | 1/1986 | Sawada | 428/694 T |
| 4,596,735 | 6/1986 | Noguchi | 428/215 |
| 4,622,271 | 11/1986 | Arai | 428/615 |
| 4,939,046 | 7/1990 | Yazawa | 428/694 TP |

Primary Examiner—Leszek Kiliman
Attorney, Agent, or Firm—Sughrue, Mion, Zinn, Macpeak & Seas

[57] ABSTRACT

A metal thin film magnetic recording medium having improved S/N and reduced noise is disclosed, which has a ferromagnetic metal thin film composed mainly of Co on a non-magnetic support, characterized in that the crystallite size as determined from the thin film X-ray diffraction method is 45 Å (angstrom) or less relative to the (100) face of α-Co, and 120 Å or less relative to the (002) face of α-Co.

4 Claims, 1 Drawing Sheet

MAGNETIC RECORDING MEDIUM

This is a Continuation of application Ser. No. 07/521,483 filed May 10, 1990, now abandoned.

FIELD OF THE INVENTION

This invention relates to a ferromagnetic metal thin film type recording medium, particularly to a magnetic recording medium of the ferromagnetic metal thin film type having improved S/N and reduced noise.

BACKGROUND OF THE INVENTION

In recent years, as high recording capacity and high density recording have been demanded, it has been strongly desired for magnetic recording media to have improved recording density.

As the recording medium for high density recording, the so-called metal thin film type magnetic recording medium having a ferromagnetic metal thin film formed by to the vacuum film forming methods such as the vacuum vapor deposition method or the sputtering method on a non-magnetic support is suitable, and its practical application has been promoted.

That is, the thin film type magnetic recording medium has high coercive force and squareness ratio, as well as excellent electromagnetic characteristics in short wavelength recording, and also is thin in thickness of the magnetic layer, thus having excellent characteristics as a magnetic recording medium for high density recording, such as low recording demagnetization or thickness loss during reproduction.

And, among them, a metal thin film type magnetic recording medium using a Co—Ni type alloy for the magnetic layer has good magnetic characteristics. Particularly, an alloy comprising about 80 atomic % of Co and 20 atomic % of Ni can provide a metal thin film type magnetic recording medium which is low in deterioration of magnetic characteristics and excellent in weathering resistance.

However, the metal thin film type magnetic recording medium using a Co—Ni type alloy as the magnetic layer has the problem that S/N could not be increased as expected due to great noise.

As the means for reducing noise, there has been an attempt to make crystal grains constituting the magnetic layer finer by vapor depositing a Co—Ni type alloy on a non-magnetic support, and various contrivances about how to introduce oxygen gas have been proposed.

For example, JP-A-58-41442 and JP-A-58-83328 (the term "JP-A" as used herein means an "unexamined published Japanese patent application) disclose methods of introducing oxygen from the higher incident angle side in vapor depositing obliquely a Co—Ni type alloy.

JP-A-58-41443 and JP-A-58-83327 disclose methods of introducing oxygen conversely from the lower incident angle side.

Also, methods of introducing oxygen gas with concern for the incident angle of a vapor stream of a Co—Ni type alloy are disclosed in JP-A-62-102427, JP-A-60-157728, JP-A-62-26639, and JP-A-62-121929.

JP-A-60-154323 discloses a magnetic layer with particle size of a Co—Ni type alloy of 50 to 100 Å, and particle size of a Co—Ni oxide of 30 to 70 Å according to analysis by TEM (transmission type electron microscope) by introducing oxygen gas from the minimum incident angle.

However, even according to the methods proposed in the prior art, reduction of noise cannot be said to be satisfactory, but Y-output is lowered, consequently failing to make S/N greater. Furthermore, the size of crystal grain did not correspond to S/N.

The present inventors have investigated with a presumption that the crystallite size of the Co—Ni type alloy may be more important than the size of crystal grains in considering the noise of the magnetic layer of the Co—Ni type alloy. Consequently, they found that the crystallite size as determined by the thin film X-ray diffraction method and noise directly correlate.

Also, it has been found that, according to the film-forming methods of the prior art as mentioned above, only films with the crystallite size in the magnetic layer of the Co—Ni type alloy of 50 Å or more as seen in the (100) face of $\alpha$-Co, or 130 Å or more as seen in (002) face of $\alpha$-Co could be obtained.

SUMMARY OF THE INVENTION

The present invention has been accomplished in view of the problems of the prior art, and is intended to provide a metal thin film type magnetic recording medium comprising a Co—Ni type alloy as the magnetic layer having low noise, excellent S/N and also good weathering resistance.

The object of the present invention as mentioned above can be accomplished by providing,a metal thin film type magnetic recording medium having a ferromagnetic metal thin film composed mainly of Co on a non-magnetic support, characterized in that the crystallite size as determined from the thin film X-ray diffraction method is 45 Å (angstrom) or less relative to the (100) face of $\alpha$-Co, and 120 Å or less relative to the (002) face of $\alpha$-Co.

BRIEF DESCRIPTION OF THE DRAWINGS

The FIGURE of the Drawing is a sectional view of the principal part of the wind-up vapor deposition device for practicing the method for preparing the magnetic recording medium of the present invention.

DETAILED DESCRIPTION OF THE INVENTION

Figure 1:
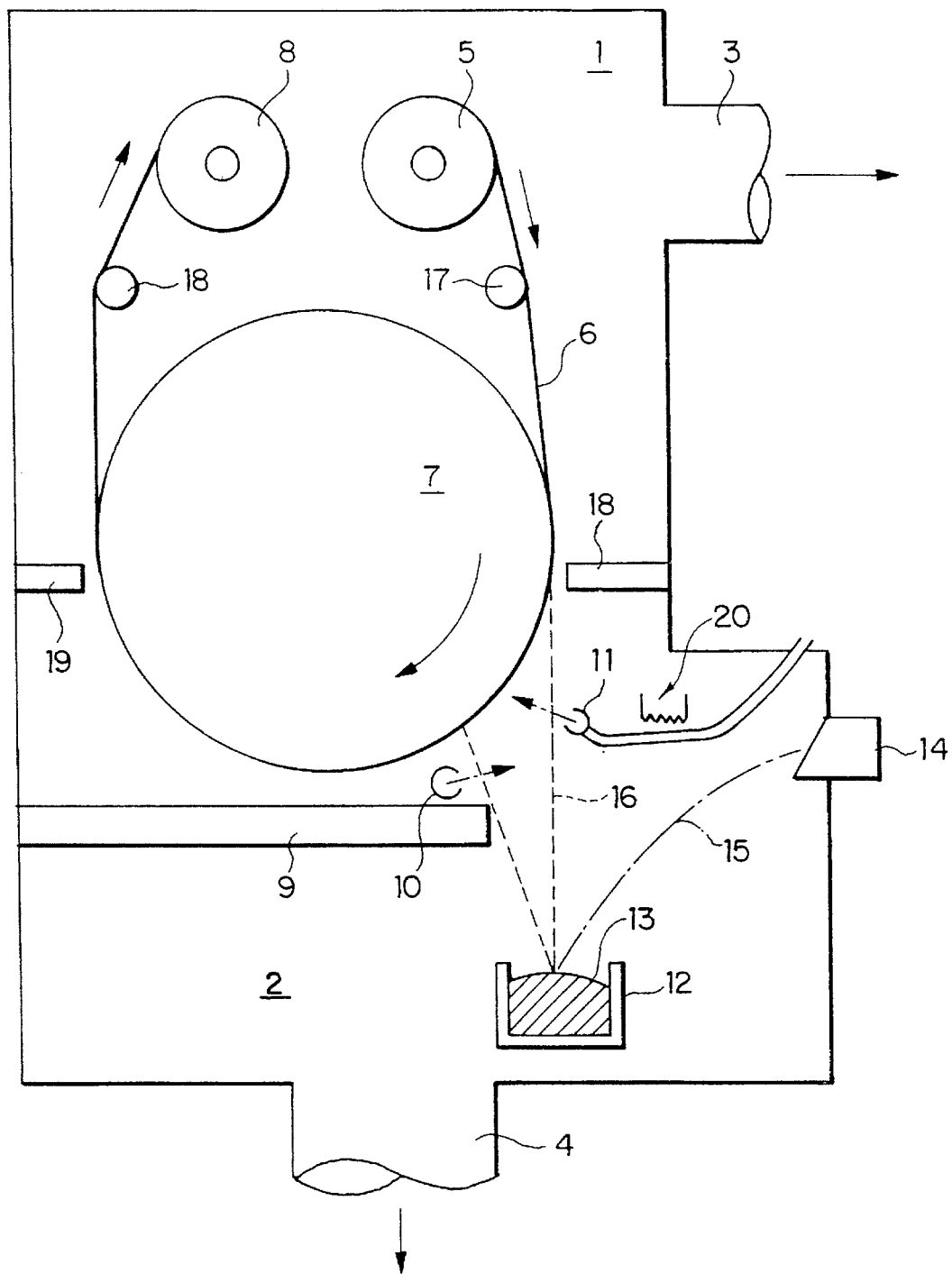

In the metal thin film type magnetic recording medium of the present invention, because the crystallite size of the metal composed mainly of Co constituting the thin film of the magnetic layer has a strong correlation with noise, noise can be reduced, thereby increasing S/N.

The present inventors have further investigated how to accomplish the object of the present invention, and consequently found that, while crystallite size of the metal composed mainly of Co exhibits a strong correlation with noise, the crystallite size of CoO correlates with Y-output.

Thus, in the thin film type magnetic recording medium of the present invention, by controlling the crystallite size of the metal composed mainly of Co constituting the thin film of the magnetic layer and having a strong correlation with noise, and also controlling the crystallite size of the metal oxide composed mainly of CoO constituting the magnetic layer and having a correlation with output within a specific range, noise is reduced without lowering output, whereby C/N correlated with S/N is higher.

More specifically, by forming the magnetic layer of a metal thin film composed mainly of Co with the crystallite size of the (100) face of $\alpha$-Co being 45 Å or less, and the crystallite size of the (002) face of α-Co being 120 Å or less as measured by the X-ray diffraction method conducted with an incidental angle of X-ray to the thin film of 1° or less and preferably with the crystallite size, as determined by the above thin film X-ray diffraction method, being within the specific range of 20 to 70 Å relative to the (100) face of CoO, C/N of the metal thin film type magnetic recording medium could be improved.

The thin film type magnetic recording medium of the present invention can be obtained according to the method as described below by using, for example, a wind-up vapor deposition device of which a sectional view of the principal part is shown in the Figure.

From the delivery roll 5 in the delivery wind-up chamber 1 of the wind-up vapor deposition device depicted in the Figure, the non-magnetic support 6 is delivered, conveyed by the conveying roll 17, while passing near the partitioning wall 18 and crawling along the cooling can 7 to enter the film forming chamber 2, the passing near near the partitioning wall 19, and is conveyed by the conveying roller 17', followed by wind-up on the wind-up roll 8.

On the other hand, evacuation is effected through the evacuation outlets 3 and 4, to set the above delivery wind-up chamber 1 and the above film forming chamber 2 to predetermined degrees of vacuum, generally in the range of $1 \times 10^{-3}$ to $1 \times 10^{-7}$ Torr and preferably $1 \times 10^{-5}$ Torr or less.

In the crucible 12 placed in the above film forming chamber 2, there is a ferromagnetic metal 13 of the Co type as the vapor deposition material. The ferromagnetic metal 13 is heated, melted and vaporized by the electron beam 15 radiated from the electron gun 14, and the vapor stream 16 is directed toward the non-magnetic support 6 while on the cooling can 7. The vapor stream 16 is cut off at the lower incident angle side by the attachment preventing plate 9. Simultaneously with the above vapor stream 16, onto the surface of the above non-magnetic support 6 is introduced an oxidizable gas through the gas introducing inlet 10 provided above said attachment preventing plate 9 placed on the lower incident angle side of the vapor stream 16 and through the gas introducing inlet 11 placed on the higher incident angle side of the vapor stream 16. The oxidizable gas introduced through the gas-introducing inlet 11 is heated by the heater 20.

As the oxidizable gas, oxygen, nitrous oxide, ozone or a gas mixture containing an inert gas such as argon, nitrogen, etc. mixed therewith can be used, desirably a gas mixture of oxygen with argon or nitrogen. Argon or nitrogen is preferably contained in the gas mixture in an amount of 50 vol % or less.

The oxidizable gas introduced from the higher incident angle side of the vapor stream 16 should be preferably heated to 200° C. or higher by the above heater, more preferably to 250° C. to 300° C.

The incident angle as herein mentioned refers to the angle formed between a line normal to the above cooling can 7 and the above vapor stream 16.

The amount of the above oxidizable gas introduced depends on the scale of the vapor deposition device, the width of the above non-magnetic support 6, and the conveying speed of the above non-magnetic support 6, but it is preferred that the amount of the oxidizable gas is adjusted such that the oxygen content in the deposited layer made of Co, Ni and O is within the range of 5 to 10 atomic %. Further, the conveying speed of the non-magnetic support 6 is preferably 20 to 100 m/min.

Since magnetic characteristics will be lowered if the amount of the above oxidizable gas introduced is too small or too large, care must be taken about this point.

The direction in which the oxidizable gas is introduced through the above introducing inlet 11 should be preferably such that the incident angle of its extension reaching the above cooling can 7 should be greater than the center value (($\theta$max+$\theta$min)/2) of the maximum incident angle ($\theta$max) and the minimum incident angle ($\theta$min) of the above vapor stream 16 and preferably 45° or more.

According to the vacuum vapor deposition method as described above, it may be considered that the above heated oxidizable gas acts so as to make the crystallite size of the cobalt vapor deposited on the support smaller, thereby forming cobalt oxide. In other words, the temperature of the oxidizable gas may be considered to exert great influence on the formation speed of cobalt oxide.

The crystallite size in the metal thin film magnetic layer of the metal thin film type magnetic recording medium of the present invention is 45 Å or less and preferably 20 Å or more in the (100) face of α-Co and 120 Å or less and preferably 20 Å or more in the (002) face of α-Co. If the size becomes greater than this range, the noise becomes greater, whereby the object of the present invention cannot be fully accomplished.

Further, by making the crystallite size in the (100) face of CoO 20 to 70 Å, low noise characteristics can be maintained without lowering Y-output.

However, it was impossible to prepare a metal thin film type magnetic recording medium having a crystallite size in the (100) surface of CoO of less than 20 Å, and having crystallite sizes of α-Co within the region of the present invention.

The ferromagnetic metal of the metal thin film magnetic layer of the present invention is Co as a single substance or an alloy thereof and generally contains Co in an amount of 50 wt % or more and preferably 60 wt % or more. As the alloy, Co—Ni, Co—Pt, Co—Ni—Pt, Co—Fe, Co—Ni—Fe, etc. can be used. Further, in these compositions, Al, B, Cr, etc. may be added. Also, oxides, nitrides, etc. of these may be introduced.

The amount of the above-mentioned element for forming an alloy with Co is limited to the extent capable of maintaining the crystalline structure (FCC) of α-Co. For example, with a metal thin film type magnetic recording medium having a composition of about 80 atomic % of Co and 20 atomic % of Ni, the (100) face of α-Co in the present invention means the (100) face of the α-$CO_{80}Ni_{20}$ alloy.

The magnetic layer of the metal thin film type magnetic recording medium of the present invention should desirably be formed according to the oblique vapor deposition method, and as its incident angle, the minimum incident angle $\theta$min should be desirably 20° to 60°, more desirably 25° to 50°, and the maximum incident angle $\theta$max should be desirably 60° to 90°, more desirably 80° to 90°.

If the ranges of the above incident angles becomes too high, the vapor deposition efficiency will be lowered to pose a problem in production cost. On the contrary, when too low, magnetic characteristics such as coercive force, angular ratio, etc. will be lowered.

The film thickness of the metal thin film type magnetic recording medium of the present invention is 500 to 5000 Å, desirably 1000 to 3000 Å.

On the surface of the magnetic layer of the metal thin film type magnetic recording medium, for the purpose of improving running performance and durability, various lubricants can be applied. For example, lubricants known in the art, including fatty acids, fatty acid esters, fatty acid amides, metal soaps, aliphatic alcohols, paraffins, silicones, etc. may be employed. Specifically, there can be employed saturated or unsaturated fatty acids having 12 or more carbon atoms such as lauric acid, myristic acid, palmitic acid, stearic acid, etc.; fatty acid esters such as ethyl stearate, stearic acid monoglyceride, amyl stearate, etc.; fatty acid amides such as capric acid amide, lauric acid amide, stearic acid amide, etc.; metal soaps of the above-mentioned fatty acids with Zn, Pb, Ni, Co, Al, Mg, Cu, etc.; aliphatic alcohols such as cetyl alcohol, stearyl alcohol, etc.; polysiloxanes with hydrogen being partially substituted with alkyl group or phenyl group and silicones obtained by modification of those with aliphatic alcohols or aliphatic amides.

Also, various fluorine compounds are excellent as lubricants. For example, perfluoropolyethers, perfluoropolyethers modified at terminal ends with polar groups, aliphatic groups or aromatic groups, fatty acid esters having fluoroalkyl or fluoroalkenyl groups, fluorine-substituted fatty acids, salts thereof and amides thereof, oligomer surfactants having fluorine substituted fatty acid groups and hydrophilic groups in the side chain, oligomer surfactants having fluorine substituted aliphatic groups and lipophilic groups in the side chain, etc. may be included.

As the non-magnetic support of the metal thin film-type magnetic recording medium of the present invention, there can be used polyesters such as polyethylene terephthalate, etc.; polyolefins such as polyethylene, polypropylene, etc.; and cellulose derivatives, vinyl resins, polycarbonates, polyimides, etc. in the form of film, sheet, disc, etc.

Also, for improving running performance, it is possible to provide a back coating layer composed mainly of a non-magnetic fine powder such as carbon black, etc. and a binder resin on the surface of the non-magnetic support opposite to the magnetic layer.

By making the crystallite size in the magnetic layer of the metal thin film composed mainly of Co 45 Å or less in the (100) face of α-Co, and 120 Å or less in the (002) face, a metal thin film type magnetic recording medium with low noise and high S/N can be obtained and, further, by making the size within the specific range of 20 to 70 Å in the (100) face of CoO, further increase of S/N can be obtained without lowering Y-output.

Referring now to Examples and Comparative Examples, the novel effect of the metal thin film type magnetic recording medium is described in detail.

EXAMPLE 1

Through the above evacuation outlets 3 and 4 of the wind-up vapor deposition device as shown in the Figure, evacuation was effected to make the initial vacuum degree in the above film forming chamber 2 to be $1\times10^{-5}$ Torr; then, a polyethylene terephthalate film with a thickness of 10 μm and a width of 100 mm was conveyed at a speed of 15 m/min. from the above delivery roll 5, and a Co—Ni type alloy of α-$Co_{80}Ni_{20}$ as the ferromagnetic metal 13 in the crucible 12 was heated by the electron beam 15 to form the vapor stream 16. At the same time, through the gas introducing inlet 10, oxygen gas of 20° to 30° C. was introduced at an introduction rate of 600 ml/min., and through the gas introducing inlet 11, oxygen gas heated to 270° to 280° C. by the heater 20 was introduced at a rate of 1200 ml/min., to form a thin film magnetic layer of a Co—Ni type alloy with a film thickness of 0.17 μm.

At this time, the minimum incident angle of the above vapor stream 16 was made 35° and the maximum incident angle was 85°.

Comparative Example 1

A metal thin film type magnetic recording medium was prepared under the same conditions as in Example 1, except for introducing no oxygen gas through the above gas introducing inlet 11.

Comparative Example 2

A metal thin film type magnetic recording medium was prepared under the same conditions as in Example 1, except for reducing the introduction rate of oxygen gas through the above gas introducing inlet 11 to 600 ml/min.

Comparative Example 3

A metal thin film type magnetic recording medium was prepared under the same conditions as in Example 1, except for increasing the introduction rate of the gas through the above gas introducing inlet 11 to 2500 ml/min.

Comparative Example 4

A metal thin film type magnetic recording medium was prepared under the same conditions as in Example 1, except for the temperature of the gas introduced through the above gas introducing inlet 11 being 20° to 30° C., which is the same as that of the gas introduced through the above gas introducing inlet 10.

EXAMPLE 2

A metal thin film type magnetic recording medium was prepared under the same conditions as Example 1, except for changing the introduction rate of the oxygen rate through the above gas introducing inlet 11 to 1800 ml/min.

EXAMPLE 3

A metal thin film type magnetic recording medium was prepared under the same conditions as Example 1, except for changing the introduction rate of the oxygen rate through the above gas introducing inlet 11 to 1500 ml/min.

The crystallite sizes and bulk noises of the ferromagnetic metal thin films of the metal thin film type magnetic recording media obtained as described above were measured under the measurement conditions shown below.

[Measurement Method of Crystallite Size]

Attachment for thin film was mounted on an X-ray diffraction device manufactured by Rigaku K.K. and, with the incident angle of X-ray to the thin film being as 1°, from the half value widths of the respective peaks for the three faces of (100) face of α-Co with 2θ of 41.7°, the (002) face with 2θ of 44.6°, the (101) face with 2θ of 47.6°, and the (111) face of CoO with 2θ of 36.5°, the crystallite size t was calculated from the following equations:

$$t = 0.9\lambda/B \cos\theta \qquad (1)$$

$$\beta = \sqrt{B_2 - b_2} \qquad (2)$$

B is the half value width of diffraction line, b is expansion of the diffraction line depending on the device, λ is wavelength of X-ray and θ is diffraction angle.

When the peak of the Co oxide is strong, the peak was overlapped with that of the (100) face of α-Co. Therefore, in that case, the crystallite size of the (100) face of α-Co was calculated from the crystallite size of the (101) face of α-Co.

The crystallite size of the (100) face of the CoO was calculated from the crystallite size of the (111) face of CoO.

[Measurement Method of Bulk Noise and Y-output]

After the metal thin film type magnetic recording medium prepared was cut into 8 mm width, a 8 mm VTR, FUJIX-8, manufactured by Fuji Film K.K. was modified, and the bulk noise in the 3 MHz region was measured by a spectrum analyzer, followed further by measurement of Y-output in the recording frequency 7 MHz by a spectrum analyzer.

The bulk noise and the Y-output of the magnetic recording medium of Comparative Example 1 were made 0 dB.

The measurement results are shown Table 1,

TABLE 1

| | Co Crystallite Size (Å) | | CoO Crystallite Size (Å) | Bulk Noise | Y-Output |
|---|---|---|---|---|---|
| | (100) Face | (002) Face | 100 Face | (dB) | (dB) |
| Example 1 | 43 | 114 | 49 | −3.1 | −0.1 |
| Comparative Example 1 | 52 | 153 | 24 | 0 | 0 |
| Comparative Example 2 | 48 | 132 | 36 | −0.3 | 0.2 |
| Comparative Example 3 | unmeasurable | unmeasurable | 91 | — | — |
| Comparative Example 4 | 41 | 123 | 55 | −0.8 | 0.1 |
| Example 2 | 25 | 118 | 78 | −3.4 | −2.1 |
| Example 3 | 41 | 110 | 67 | −3.1 | −0.5 |

The magnetic recording media from Example 1 to Example 3 having crystallite sizes of Co within the range of the present invention were considerably reduced in bulk noise. Among them, in Example 1 and Example 3, having crystallite sizes of CoO within the range of 20 to 70 Å Y-output was only slightly reduced.

In the metal thin film type magnetic recording medium of Comparative Example 3, substantially no peak of α-Co appeared, and the crystallite size was unmeasurable. Perhaps, it may be considered to exist in the super-paramagnetic region.

While the invention has been described in detail and with reference to specific embodiments thereof, it will be apparent to one skilled in the art that various changes and modifications can be made therein without departing from the spirit and scope thereof.

What is claimed is:

1. A metal thin film magnetic recording medium having a ferromagnetic metal thin film mainly comprising Co on a non-magnetic support, wherein the crystallite size of the (100) face of α-Co of the Co in the thin film is 20 Å to 45 Å, the crystallite size of the (002) face of α-Co of the Co in the thin film is 100 Å to 120 Å, and the crystallite size of the (100) face of CoO of the Co of the thin film is between 20 and 70 Å, as determined by the thin film X-ray diffraction method.

2. A metal thin film magnetic recording medium according to claim 1, wherein the ferromagnetic metal thin film is composed of mainly Co or an alloy thereof selected from the group consisting of CoNi, Co—Pt, Co—Ni—Pt, Co—Fe and Co—Ni—Fe.

3. A metal thin film magnetic recording medium according to claim 1, wherein the ferromagnetic metal thin film is formed using an oblique vapor deposition method during which method the minimum incident angle is 20° to 60°.

4. A metal thin film magnetic recording medium according to claim 1, wherein the surface of the magnetic layer thereof contains a lubricant thereon.

* * * * *